United States Patent

Zable et al.

[11] Patent Number: 6,147,698
[45] Date of Patent: *Nov. 14, 2000

[54] DENSITY CONTROL FOR A PRINTER

[75] Inventors: Jack Louis Zable, Niwot; William Chesley Decker, Longmont, both of Colo.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,039

[22] Filed: May 29, 1997

[51] Int. Cl.⁷ ........................................................ B41J 2/47
[52] U.S. Cl. .......................... 347/240; 347/251; 399/49; 399/55; 399/66; 399/72
[58] Field of Search ..................................... 347/240, 251, 347/254; 399/39, 49, 55, 72, 74, 47, 51, 66

[56] References Cited

U.S. PATENT DOCUMENTS

| | | |
|---|---|---|
| 4,464,043 | 8/1984 | Koumura et al. . |
| 4,526,462 | 7/1985 | Hope et al. . |
| 4,657,378 | 4/1987 | Hope et al. . |
| 4,745,467 | 5/1988 | Sekizawa et al. . |
| 4,873,570 | 10/1989 | Suzuki et al. . |
| 5,075,725 | 12/1991 | Rushing et al. ........................... 399/39 |
| 5,079,624 | 1/1992 | Sasuga et al. . |
| 5,081,529 | 1/1992 | Collette . |
| 5,107,332 | 4/1992 | Chan . |
| 5,398,124 | 3/1995 | Hirota . |
| 5,483,360 | 1/1996 | Rolleston et al. . |
| 5,500,921 | 3/1996 | Ruetz . |
| 5,508,826 | 4/1996 | Lloyd et al. . |
| 5,512,988 | 4/1996 | Donaldson ............................... 399/120 |
| 5,528,270 | 6/1996 | Tajika et al. . |
| 5,550,626 | 8/1996 | Kobayashi et al. . |
| 5,553,199 | 9/1996 | Spaulding et al. . |
| 5,749,021 | 5/1998 | Mestha et al. ............................ 399/49 |

*Primary Examiner*—N. Le
*Assistant Examiner*—Hai C. Pham
*Attorney, Agent, or Firm*—William N. Hogg

[57] ABSTRACT

A method and apparatus for controlling the density of the printed medium of a printer is provided and comprises the following steps. First a control strip is printed on the print medium having at least two coverage patches having a first and second different standard density. Next, the optical density of each of the patches are measured. Next a first and second tolerance limit is determined for the first and second patch, respectively. The next step is to determine whether the measured optical density of the first patch is within a first tolerance of the first standard density. If the first measured optical density is not within tolerance of the first standard density, then a change of at least one printer parameter is calculated such that the first density is corrected within the first tolerance. Then the effect of the change of the printer parameters on the second optical density is determined. If the second optical density with the effect is not within the second tolerance, then a change of at least one other printer parameter is calculated so that the second optical density with the effect is within the second tolerance, while the first optical density is still within its tolerance. Next, new printer parameter settings are calculated from the printer parameter changes. Last, the printer parameters are automatically adjusted to the new settings.

32 Claims, 7 Drawing Sheets

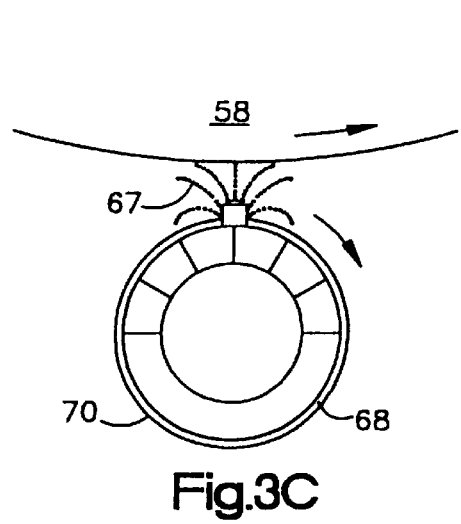
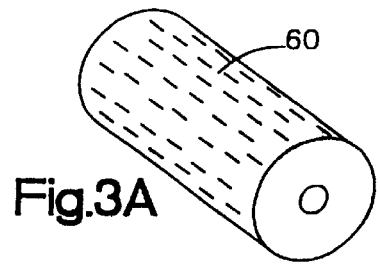
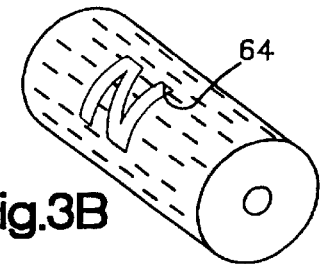
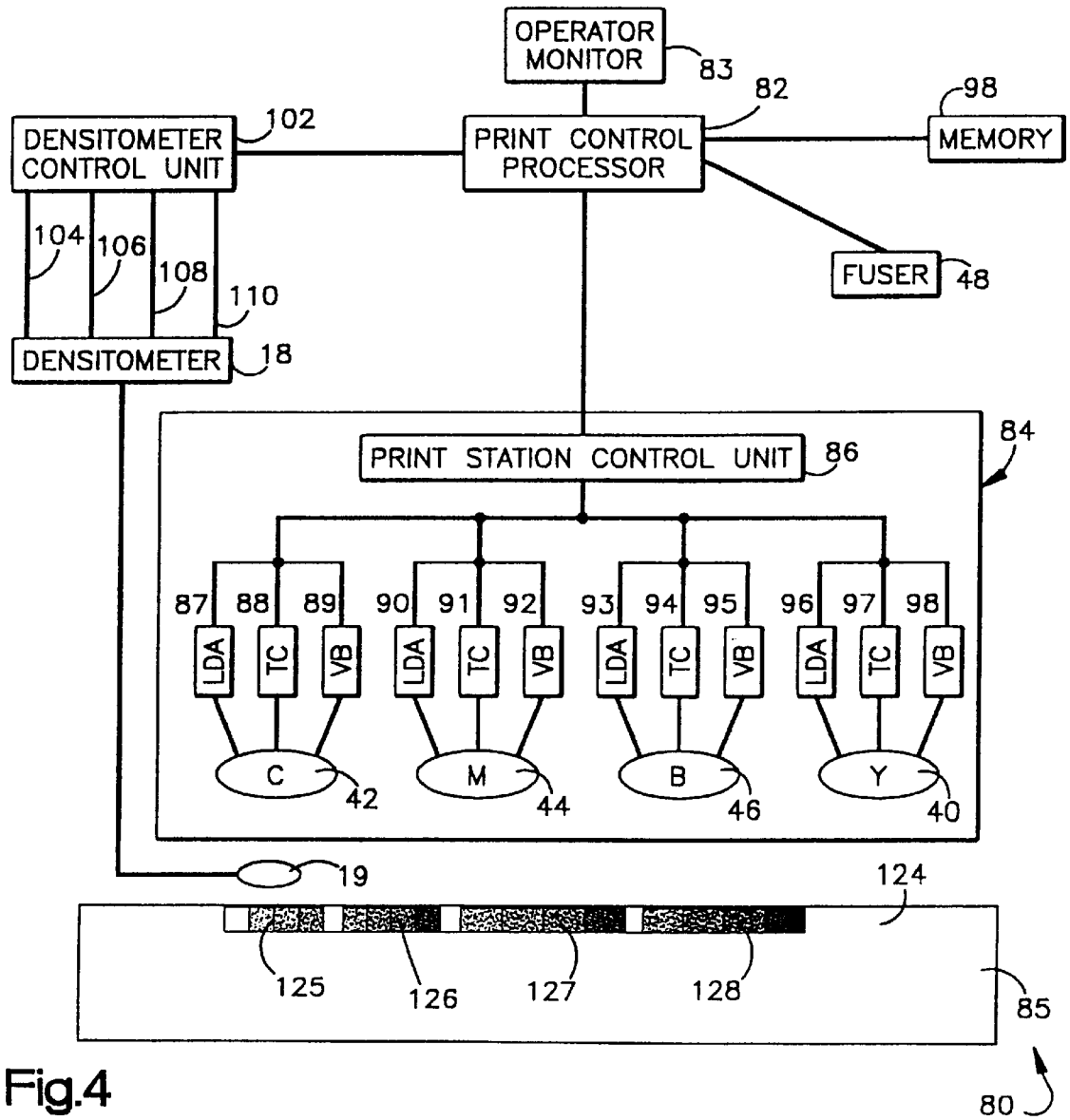
Fig.3A
Fig.3B
Fig.3C
Fig.4

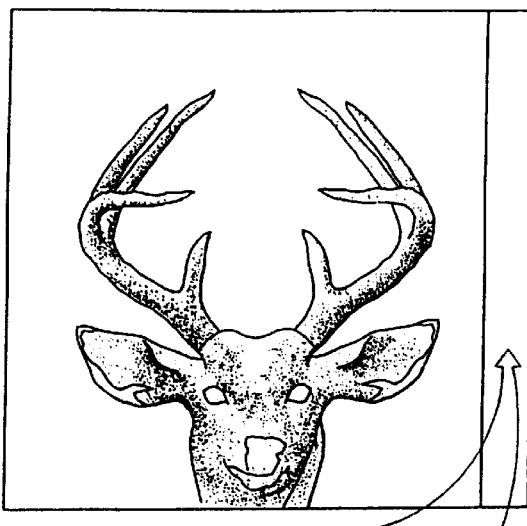
Fig.6
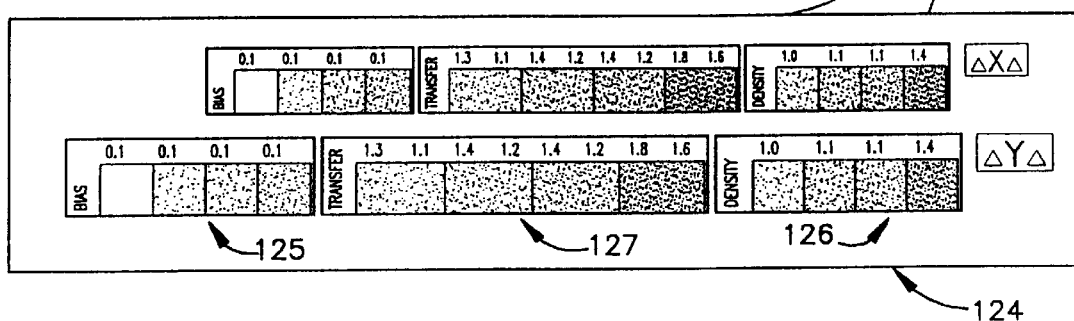
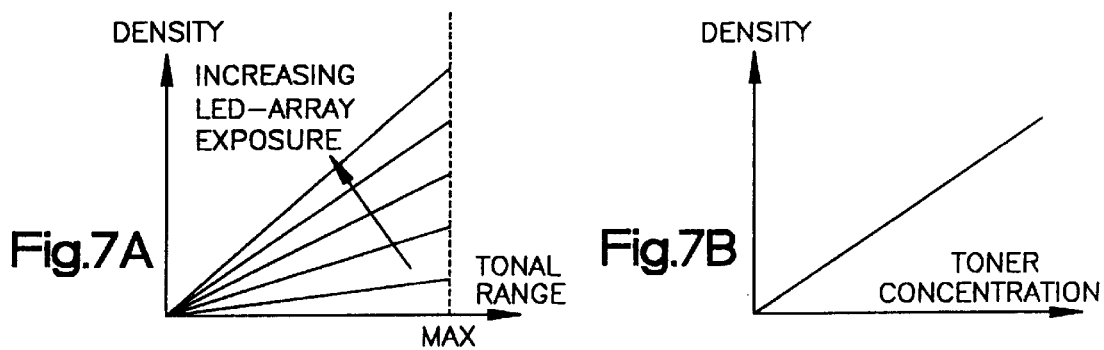
Fig.7A
Fig.7B
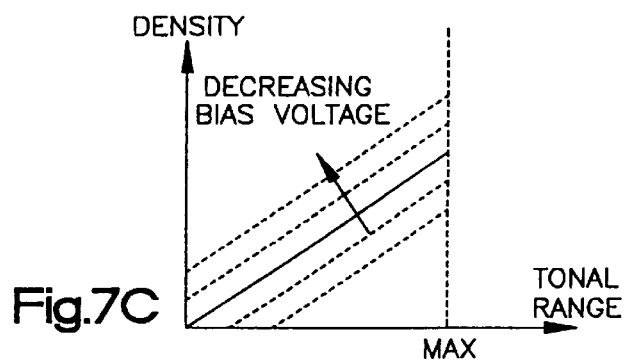
Fig.7C

DENSITY CONTROL FOR A PRINTER

FIELD OF THE INVENTION

The present invention pertains generally to controlling the density of the printed image generated by a monochrome electrostatic printer and more particularly to color electrostatic printers.

BACKGROUND OF THE INVENTION

In a full color printer, the quality of the printer output relies on the printer parameters remaining within their respective calibration limits. This typically means that the optical densities of each color must be maintained within prescribed values. For many printers, this is accomplished by generating printed samples of each color at predetermined parameter settings and then manually taking optical density measurements of the samples with an external densitometer or other equivalent density sensing instrument. Then if the measured densities vary from the expected densities, the operator based upon experience manually makes corrections to the printer parameters to bring the optical densities of each color into the prescribed limits.

This is a tedious and long process and the results are error prone. First, the tolerance limits prescribed by the printer manufacturer are often too large, resulting in unacceptable color shifts. Second, the process for obtaining the optical densities are not automated and are prone to two types of operator error. The first type of operator error is that the operator can easily confuse or forget the density readings manually taken. The second type of operator error is that the operator may lack the skill or experience to take the appropriate corrective action. In addition, even a skilled operator may not make optimal corrections because of the intricate nature of the various parameter changes on toner density at the various levels.

SUMMARY OF THE INVENTION

The present invention overcomes these and other disadvantages of the prior art by providing in one aspect a method for controlling the density of the printed medium of a printer comprising the steps of: printing a control strip on the print medium having at least two coverage patches having a first and second different standard density; measuring the optical density of each of said patches; determining a first and second tolerance limit for said first and second patch, respectively; determining whether the measured optical density of said first patch is within a first tolerance of the first standard density; if said first measured optical density is not within said tolerance of said first standard density, calculating a change of at least one printer parameter to change said first density within said tolerance; calculating the effect of said change of the printer parameters on the second optical density; if said second optical density with said effect is not within said second tolerance, calculating a change of at least one other printer parameter so that said second optical density with said effect is within said second tolerance, and said first optical density is still within said first tolerance; calculating new printer parameter settings from said changes; and thereafter adjusting said printer parameters to said new settings.

In accordance with another aspect of the invention, a method is provided for correcting the density of the print medium of a printer comprising the steps of: printing a control strip on a print medium having at least three coverage patches of different densities, said patches having a first, a second, and a third standard density; measuring the optical density of each of said patches on a print medium; determining a first, second and third tolerance limit for said first, second and third patch, respectively; determining whether the first measured optical density of said first patch is within a first tolerance of the first standard density; if said first measured optical density is not within said first tolerance of said first standard value, calculating the change of a first printer parameter to change said first density within said tolerance; calculating the effect of said change of the printer parameter on the second and third optical densities; determining whether the measured optical density of said second patch with the effect of said printer parameter change is within a second tolerance of the second known standard density; if said second measured optical density is not within said second tolerance of said second standard density, calculating the change in a second printer parameter to change said second density with said effect of said first printer parameter change within said tolerance while still keeping said first density within said first tolerance; calculating the effect of said change of the second printer parameter on the third optical density; determining whether the measured optical density of said third patch with said effect of said change of said first and second printer parameter is within a third tolerance of the third standard density; if said third measured density with said effect of said first and second printer parameter change is not within a third tolerance of said third standard density, calculating the change of a third printer parameter so that said third measured density is within said tolerance; calculating new printer parameter settings from said changes of said printer parameters; and thereafter adjusting said printer parameters to said new settings.

In accordance with another aspect of the invention, an apparatus is provided for controlling the density of a printer comprising: a printer mechanism adapted for printing upon a medium having at least one print station; said print station having at least two printer control parameters; said printer mechanism adapted for printing a control strip on the print medium having at least two coverage patches having a first and second different standard density; a calibrated optical sensor assembly adapted for measuring the optical density of each of said patches; a memory device for storing a first and second tolerance limit for said first and second patch, respectively; a control processor adapted for determining whether the measured optical density of said first patch is within a first tolerance of the first standard density; if said first measured optical density is not within said tolerance of said first standard density, said control processor adapted for calculating a change of at least one printer parameter to change said first density within said tolerance; said control processor adapted for calculating the effect of said change of the printer parameters on the second optical density; if said second optical density with said effect is not within said second tolerance, said control processor adapted for calculating a change of at least one other printer parameter so that said second optical density with said effect is within said second tolerance, and said first optical density is still within said first tolerance; said control processor adapted for calculating new printer parameter settings from said changes and adjusting said printer parameters to said new settings.

In accordance with another aspect of the invention, an apparatus is provided for controlling the density of a printer comprising: a printer mechanism adapted for printing upon a medium having at least one print station; said print station having at least three printer control parameters; said printer mechanism adapted for printing a control strip on the print medium having at least three coverage patches having a first, second and third different standard density; a calibrated optical sensor assembly adapted for measuring the optical density of each of said patches; a memory device for storing a first, second and third tolerance limit for said first, second and third patch, respectively; a control processor adapted for determining whether the first measured optical density of said first patch is within a first tolerance of the first standard density; if said first measured optical density is not within said first tolerance of said first standard value, said control processor adapted for calculating the change of a first printer parameter to change said first density within said tolerance; said control processor adapted for calculating the effect of said change of the printer parameter on the second and third optical densities; said control processor adapted for determining whether the measured optical density of said second patch with the effect of said printer parameter change is within a second tolerance of the second known standard density; if said second measured optical density is not within said second tolerance of said second standard density, said control processor adapted for calculating the change in a second printer parameter to change said second density with said effect of said first printer parameter change within said tolerance while still keeping said first density within said first tolerance; said control processor adapted for calculating the effect of said change of the second printer parameter on the third optical density; said control processor adapted for determining whether the measured optical density of said third patch with said effect of said change of said first and second printer parameter is within a third tolerance of the third standard density; if said third measured density with said effect of said first and second printer parameter change is not within a third tolerance of said third standard density, said control processor adapted for calculating the change of a third printer parameter so that said third measured density is within said tolerance; said control processor adapted for calculating new printer parameter settings from said changes of said printer parameters and adjusting said printer parameters to said new settings.

To the accomplishment of the foregoing and related ends, the invention then comprises the features hereinafter fully described and particularly pointed out in the following detailed description made with reference to the annexed drawings which set forth in detail certain illustrative embodiments of the invention, these being indicative however, of but some of the various ways in which the invention may be employed.

BRIEF DESCRIPTION OF THE DRAWINGS

FIGS. 3A and 3B are schematic views of the photoconductive drum as shown in FIG. 2 with before and after exposure of an image, respectively;

FIG. 3C is a schematic view of the developer unit shown in FIG. 2;

FIG. 4 is a schematic view of the color printer assembly of the present invention;

FIG. 6 is a plan view of a typical printer control strip;

FIGS. 7A–7C are graphical representations of the effect of the variation of the light source intensity, toner concentration, and bias voltage on optical density, respectively, of a electrostatic printer shown in FIG. 1.

DETAILED DESCRIPTION OF PREFERRED EMBODIMENTS

Figure 1:
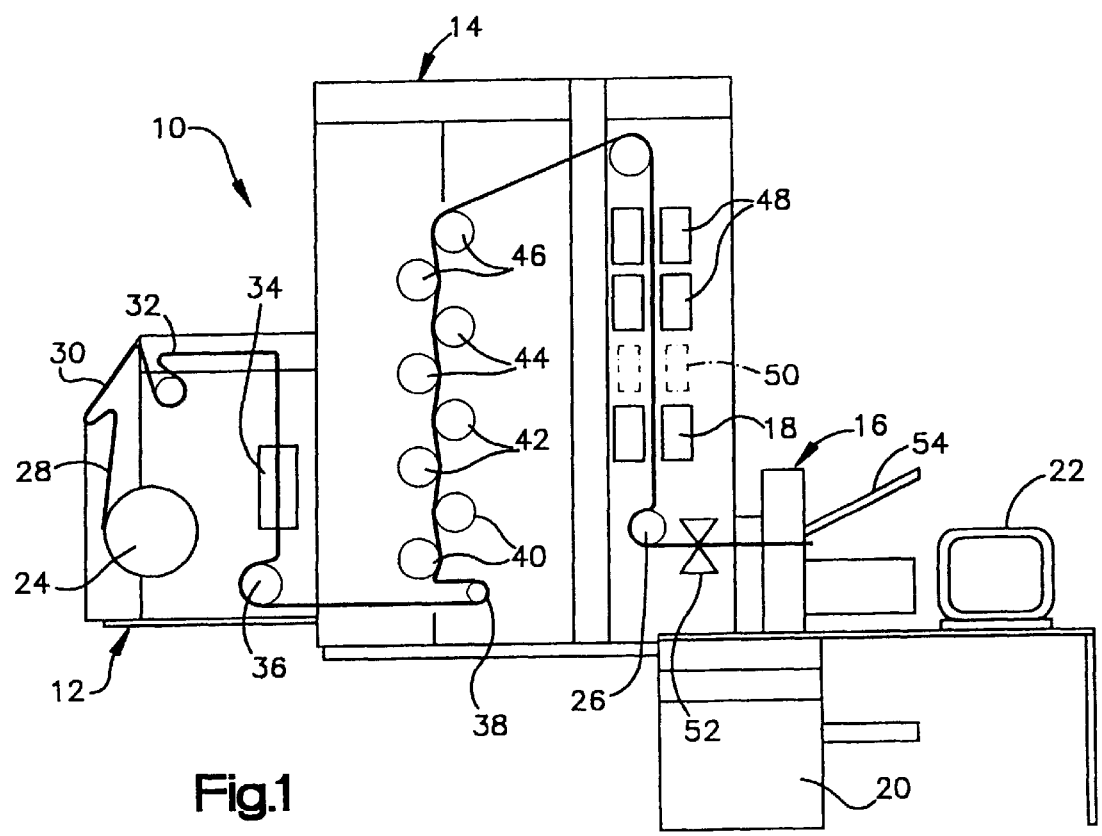
FIG. 1 is a schematic representation of a typical color printer.

Before discussing the particulars of the present invention, a brief summary of color electrostatic printing will be presented. FIG. 1 shows a typical color electrostatic printer 10 used primarily in industrial settings. The printer has a paper supply and conditioner unit 12, a printing tower 14, a paper output unit 16, a densitometer 18, and a printer control computer 20 including a monitor 22 for use by an operator. The paper supply and conditioning unit 12 contains a paper reel 24 from which the paper 28 is pulled through the printer by web drive motor 26 as explained further, below. The paper supply and conditioning unit 12 first unwinds the paper 28 and then passes the paper through a splicing table 30, a heated paper drying roll 32, and a paper cooling unit 34 to ensure the paper is properly conditioned before entering the print stations. A paper condition sensor 36 monitors the humidity and temperature of the paper to ensure the paper is within specification. The paper then passes over a first web drive motor 38 which controls the tension and speed of the paper through the printer. The paper then enters the printer tower unit 14 which contains 2 sets of four printing stations, one set of printing stations for printing on the front side of the paper and a second set of print stations for printing on the backside of the paper. There are four printing stations within each set because each printing station prints a single color. Thus there is a yellow print station 40, a cyan print station 42, and a magenta print station 44 for printing color utilizing a color subtractive process. There is also a black printing station 46 to print black ink because this reduces the total quantity of ink required while producing better gray and black tones.

Thus to achieve a particular color such as purple, the appropriate percentages of magenta, yellow, cyan and black are calculated using appropriate color rendering methods. Then the appropriate percentage of yellow toner is printed at the yellow print station. Next, the appropriate percentage of cyan toner is printed over the yellow portion at the cyan print station. Then the appropriate percentage of magenta toner is printed over the yellow and cyan sections. Finally, black is printed over the yellow, magenta and cyan sections, such that the particular desired shade of purple is obtained.

Figure 2:
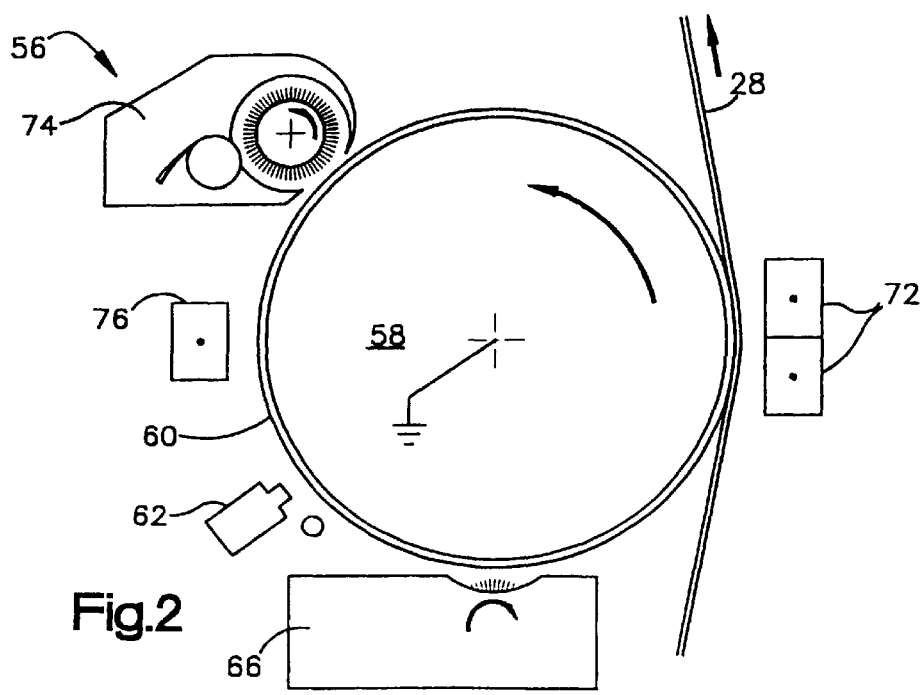
FIG. 2 is a schematic representation of a color printing station of the color electrostatic printer shown in FIG. 1.

The structure and method of operation of the print station are well known in the art, but a brief review of such operation will assist in describing the invention. Each of the print stations operate similarly but with a different color or black toner. FIG. 2 is a schematic representation of a typical electrostatic print station 56. The print station comprises a drum 58 having an exterior photoconductive surface 60. The photoconductive surface 60 is an insulator in darkness, but when exposed to a light source 62 it becomes conductive. The drum 58 rotates as the paper 28 moves through the printer. As shown in FIGS. 2 and 3A, the surface of the drum 60 is charged to a uniform negative potential by means of a main charge unit 76 which utilizes a corona (not shown) to apply electrostatic charges upon the photoconductive surface. Thus the photoconductive drum surface 60 is negatively charged.

Next, the image to be printed is formed by the writing head 62 shown in FIG. 2. The image is 'written' by transmitting light onto the photoconductive drum's surface 60 in the areas where the image should be, and no light where the paper should remain white. In the area where the drum is exposed to light, the photoconducting surface 60 becomes conductive such that the charges flow to the ground and the charge potential approaches zero. In the areas where the drum is not exposed to light thus representing where the paper is to remain white, the photoconductive surface 60 remains negatively charged. As a result, a latent electrostatic image 64 (of the letter N) has been formed as shown in FIG. 3B.

The light source 62 which generates the image can be a light emitting diode (LED) array mounted parallel to the photoconductive drum axis. The LED's are typically closely spaced and can individually be turned on and off. As the drum precisely rotates, the desired LED's are turned on such that the image is generated dot by dot and then line by line. The light source may also be a laser.

After the latent image is written, the latent image is then developed in the developer unit 66. The developer unit 66 deposits color or black toner particles 67 on the drum. The developing unit 66 contains a mixture of toner and magnetisable carrier particles or beads which when stirred, become tribo-electrically charged. Thus the toner will stick to the carrier. The toner and carrier are attracted to a magnetic roller 68 shown in FIG. 3C and form a magnetic brush 70. When an area of the drum 58 containing a latent image rotates past the magnetic brush 70, the toner particles 67 will be torn away from the carrier particles and attracted towards the drum. The toner particles are attracted to the drum because of the electrical field gradient between the drum and the magnetic brush. The higher the intensity of light exposed at a given location on the drum, the more the toner will be attracted to the drum. The negatively charged toner will be attracted to the relatively positive latent image on the drum due to the positive electric field gradient in this region. The carrier beads will remain in the developer unit because of the magnetic attraction of magnetic roller, 68.

As shown in FIG. 2, the developed image on the drum 58 formed by the toner particles is transferred to the paper passing the drum 58 by the transfer station coronas 72. Next the drum 58 rotates past the cleaning station 74 where remaining toner particles are removed. The print cycle continues as the drum 58 passes the main charge unit 76 so that the drum will be charged again.

After the paper has left the first print station, the paper continues on to the next three printing stations where different colors may be superimposed as described above. As shown in FIG. 1, after the paper 28 has exited the print stations 40–46, the paper 28 then passes through a fuser 48 which heats the toner particles to fuse them into the paper fibers. The paper then enters a paper cooler 50 which cools the surface temperature of the paper to near ambient conditions. The paper then passes an optional densitometer 18 which senses the color density patches. The paper then passes over a second web drive motor 26 whose function is to pull the paper through the printer. The paper web then is sliced in the cutter 52 and then stacked in the stacker 54.

The detailed aspects of the invention to control certain print station parameters can now be presented. Although the following features of the invention are described in relation to an IBM Infocolor 70 color printer, this invention would work for other monochrome and color printers as well. FIG. 4 is a schematic block diagram of an automatic density control assembly 80 for a color printer embodying the apparatus and methods of the present invention. In accordance with the present invention, a computer or printer control processor 82 is coupled to a memory device 98 and are used to store a set of: 1) optical density standard values for a control strip; 2) a density control algorithm and constants; and 3) variable arrays. The printer control processor 82 also controls an electrostatic printing mechanism 84 which prints by applying color or black toner to a suitable medium or substrate 85, as described above. As shown in FIG. 4, the printing mechanism includes a Print station control unit 86 (PSCU) coupled to a set of print stations comprising cyan 42, magenta 44, black 46, and yellow 40, for printing upon paper or other suitable medium.

A standard densitometer 18 such as a GRETAG Model D19C with a sensing head 19 is connected to the densitometer control unit (DCU) 102 which communicates to the printer control processor 82. The densitometer 18 transmits an electric signal to the DCU 102. The densitometer has the ability to determine if the optical density measured is from a cyan, magenta, yellow, or black printed patch. The electric signal value can be a yellow optical density value 104, a magenta optical density value 106, a cyan optical density value 108 or a black optical density value 110, each at three different coverage points which will be further discussed, below. The DCU 102 communicates the electric signal values to the printer control processor 82 which stores the optical density values in the memory device 98. The printer control processor 82 then determines whether each printer station is printing color within its specification by comparing these measured density values of the control strip with the standard values, and if necessary, calculates new printer control parameters for each printing station such to bring the color densities within acceptable tolerances. If densities within acceptable tolerances cannot be achieved, the printer control processor will calculate the printer parameters that will bring the densities as close as possible to the standard values, and flash an error message to the operator monitor 83. Next, the printer control processor 82 communicates the revised printer control parameter settings 87–98 for each printing station 40–46 to the print station control unit (PSCU) 86. The printer control parameters which affect color density are the intensity of the light source or LDA (87,90,93,96), the bias voltage (89,92,95,98), and the toner concentration (88,91,94,97), and these have a different effect at different densities as will be discussed more fully, below. Then the PSCU 86 updates each print station printer control settings 87–98 to the new values.

Figure 5A:
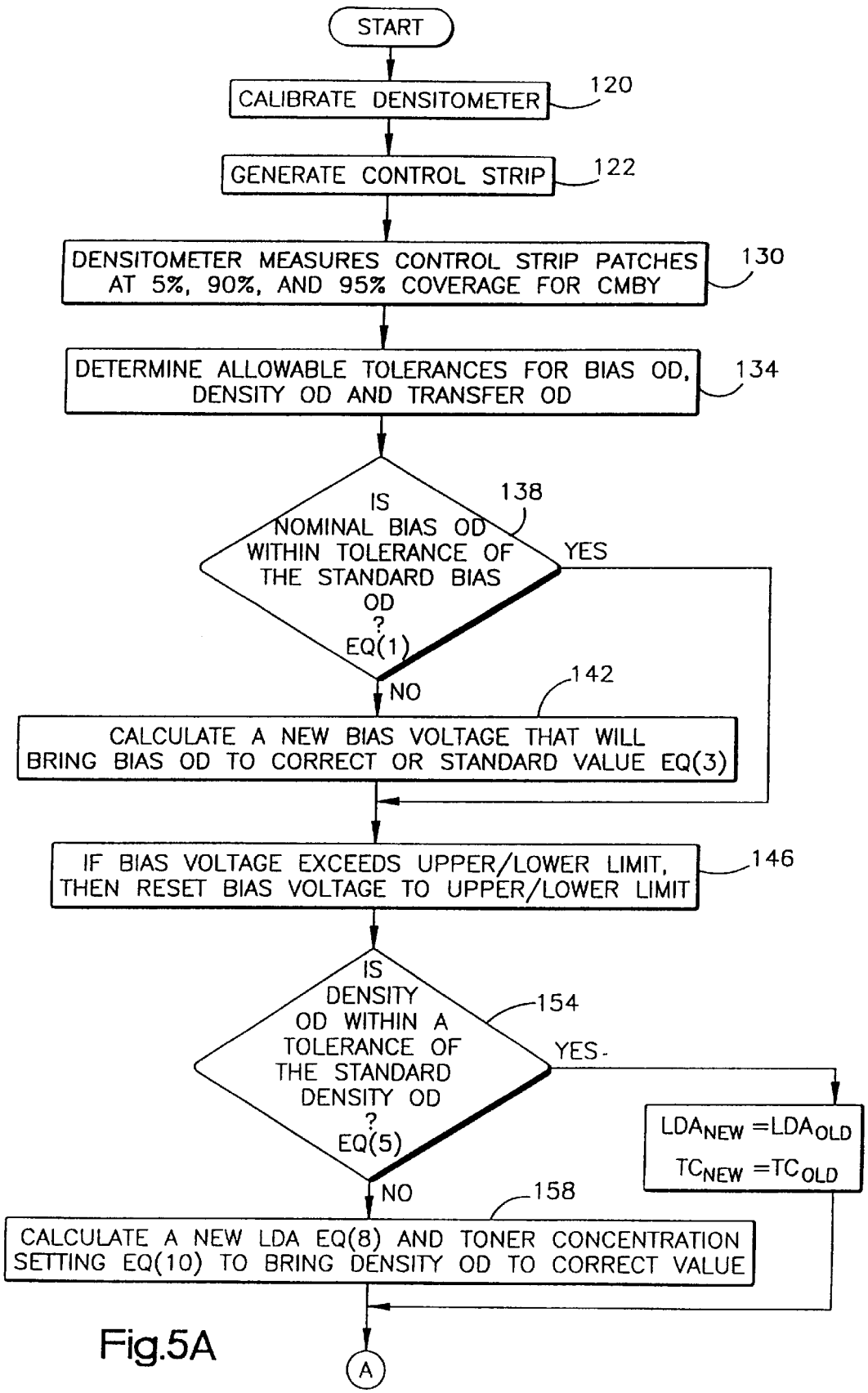
FIGS. 5A–5C are block diagrams depicting the method of the invention.
Figure 5B:
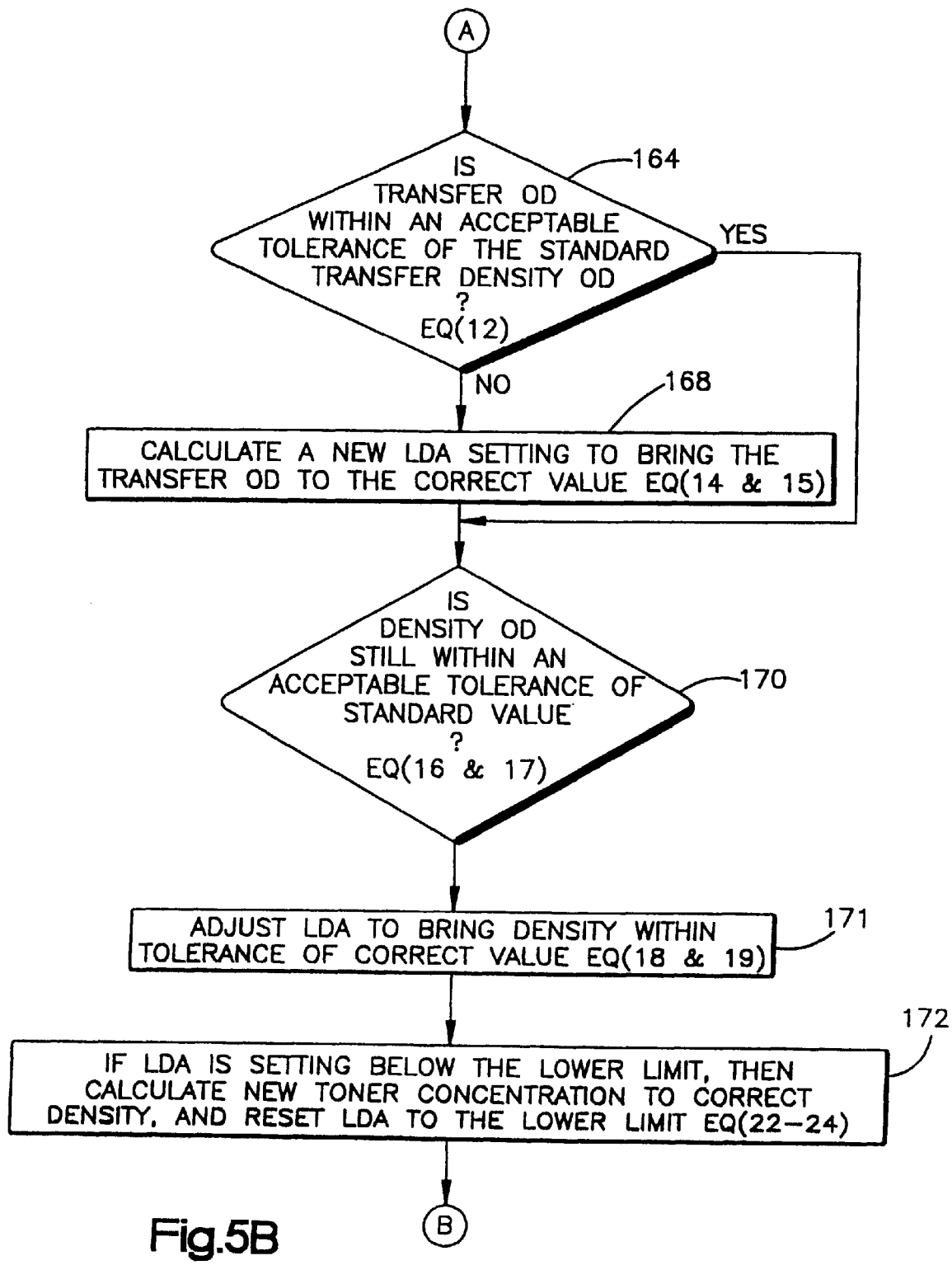
Figure 5C:
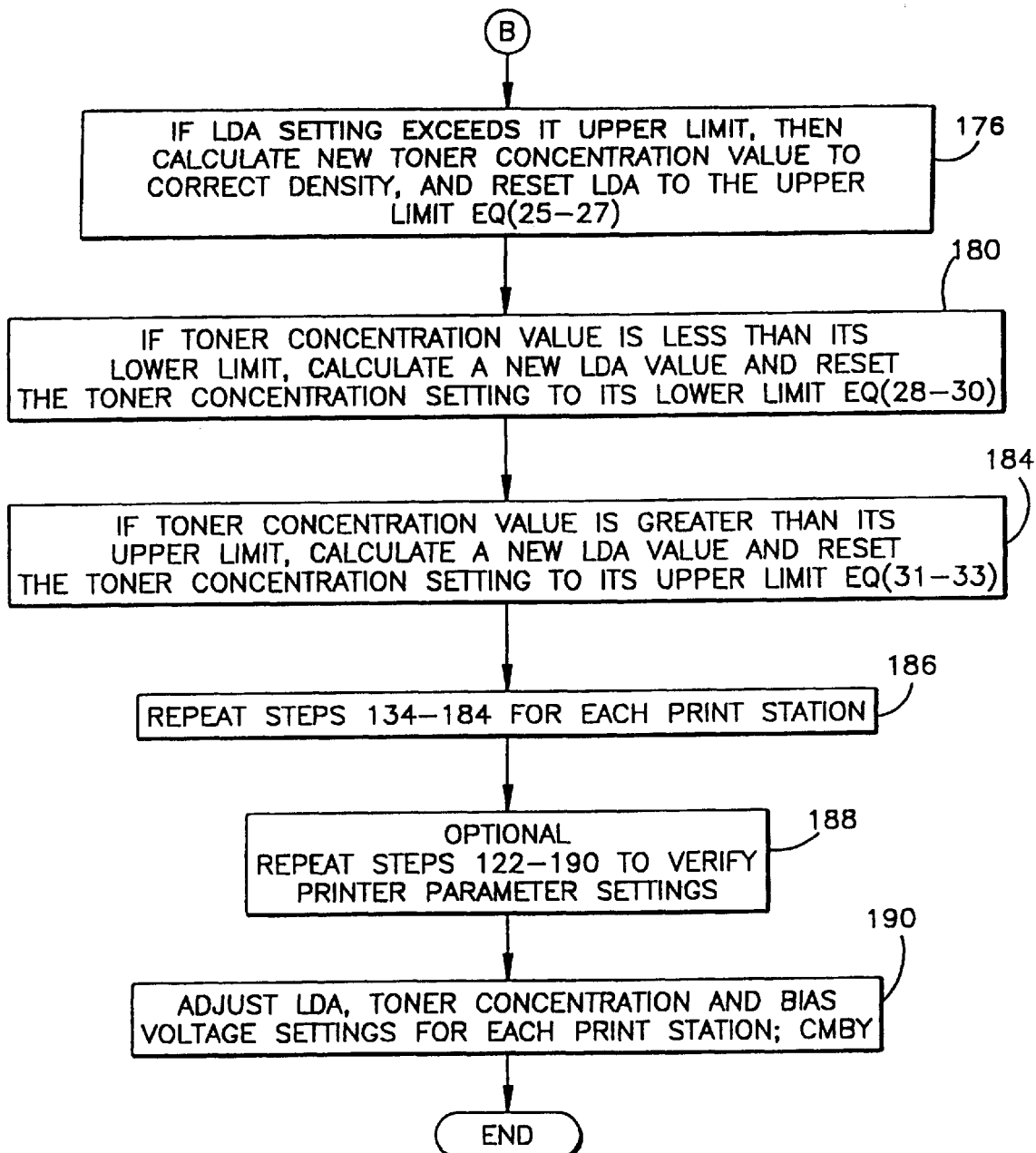

FIG. 5 is a block flow chart illustrating a method for controlling the densities of a color printer according to this invention. An initial step 120 of the method is to check the calibration of the densitometer. If the densitometer is already calibrated the densitometer calibration step may be skipped. In the next step 122 the printer control processor communicates to the printer control to generate a standard color control strip 124 of standard optical densities as is shown in FIG. 6. The term standard optical density such as for example, a 5% coverage patch, refers to the requested generation of a 0.1 optical density by the printer control processor to the PSCU. The standard optical density value will vary depending on the color and the amount of coverage.

The control strip typically comprises 16 color patches where for each color and black there is a 5% or bias coverage patch 125, a 90% or density coverage patch 126, a 95% or transfer coverage patch 127, and a 100% or saturation coverage patch 128. Hereinafter, the 5% coverage patch 125 will be referred to as the bias patch, the 90% patch 126 will be referred to as the density patch, and the 95% coverage patch 127 will be referred to as the transfer patch.

The following steps describe the method for controlling density at an electrostatic print station. Thus the following steps must occur four times in a color printer, one for each color and black print station. If the printer has eight print stations as in FIG. 1, then the following steps are done eight times. In step 130, the printer control processor will communicate with the DCU 102 control instructions such that the densitometer will measure at least two coverage patches. It is preferred that at least two of the coverage patches differ by at least 25% in optical density. It is more preferred that the two coverage patches have a 5% coverage and a 90% coverage. It is additionally preferred that three coverage patches be measured. It is more preferred that the three coverage patches are elected from the groups having a coverage range of 5–10%, 85–90%, and 95–100%. It is most preferred that the three coverage patches be the bias patch 125, the density patch 126, and the transfer patch 127 for each color and black.

The DCU 102 will then communicate the densitometer measurements 104–110 to the printer control processor 82 which will store the measured values in the memory device 98.

The next step 134 is to determine the allowable tolerances for the measured bias, transfer and density values. These tolerances may vary for different printers. They will be described with respect to an IBM Infocolor 70. The density tolerance is generally two times smaller than the manufacturer's specification. The bias tolerance is generally three times smaller than the manufacturer's specification. Last, the transfer tolerance is roughly the manufacturer's specification.

In the next step 138, the printer control processor will take the absolute value of the difference between the measured bias and the standard bias to determine whether the measured bias is within its tolerance. This is represented by equation 1 where measured bias is BIAS, the standard bias is BIASSTD, and the tolerance is ODTOL. It is preferred that the tolerance be small and three times smaller than the manufacturer specification. It is most preferably 0.03.

$$|BIAS - BIASSTD| < ODTOL \quad (1)$$

In the next step 142, if the measured bias is not within tolerance of the standard value i.e., equation 1 is not true, the printer control processor 82 will calculate a new bias voltage value for the print station 40-46 such that the BIAS will be corrected to the standard bias. It is important to note that the bias voltage of a print station has a significant effect upon the optical density of a printer at low densities as well as at higher densities, because the bias voltage regulates the electric field gradient between the photoconductor, 58 and the developer, 66, which in turn regulates the amount of toner deposited on the drum 58. The bias voltage is the voltage of the developer unit 66 and typically ranges from −630 to −540 volts. The drum 58 is initially charged electrostatically to approximately −650 volts. A latent image 64 on the drum 58 is relatively positive at approximately −100 volts. The toner 67, acting as a charged particle within an electric field, is attracted to the relatively positive latent image 64 and repelled by the more negative drum surface 60. Thus decreasing the bias voltage results in a greater electric potential between the toner and the image 64 on the drum 58, such that decreasing the bias voltage increases the amount of deposited toner 67 onto the drum image 64. As a result of the decreasing bias voltage, the color density is increased. Increasing the bias voltage decreases the amount of deposited toner thus reducing the color density. Bias voltage change ($\Delta$VBIAS) is thus linearly related to bias density change ($\Delta$BIAS) and is represented by equation 2, below.

$$\Delta VBIAS = -CONSTANT * \Delta BIAS \quad (2)$$

The CONSTANT is experimentally determined for a given toner based upon its characteristics. It is preferred that CONSTANT for an IBM Infocolor 70 printer be 500.

To calculate a new bias voltage $VB_{NEW}$ as in step 142, equation three is utilized. Equation 3 is derived from Equation (2), where $VB_{NEW}$ is the newly calculated bias voltage when the density is corrected to BIASSTD and $VB_{OLD}$ is the previous bias voltage setting which corresponds to the measured bias.

$$VB_{NEW} = VB_{OLD} - (500 * (BIASSTD - BIAS)) \quad (3)$$

After the new bias voltage $VB_{NEW}$ is calculated, the printer control processor will check to ensure it is between its upper and lower limits which are dictated by the manufacturer of the printer. In step 146, if the new bias voltage exceeds its upper limit, it will be reset to the upper limit. In step 146, if the bias voltage is below the lower limit, it will be reset to the lower limit.

The next step 150 is to calculate the effect of the bias voltage change upon the measured density value. It is known that bias voltage has an effect upon density as represented by equation 4, where the change in density ($\Delta$DENSVB) is proportional to the change in bias voltage ($\Delta$VBIAS), and CBVOD is an experimentally derived constant equal to 0.007 for an IBM Infocolor 70 color printer.

$$\Delta DENSVB = -CBVOD * \Delta VBIAS = -CBVOD * (VB_{NEW} - VB_{OLD}) \quad (4)$$

Thus as in step 154, in order to determine if the density is within tolerance, the effect of the bias voltage change on density will be taken into account when comparing the difference of the standard density and the measured density prior to a bias voltage change with the tolerance as represented by equation 5 where: DENSTD is the standard density, DENSITY is the measured density, DENTOL is the density tolerance, $VB_{NEW}$ is the new bias voltage setting and $VB_{OLD}$ is previous bias voltage setting.

$$|DENSTD - DENSITY + CBVOD * (VB_{NEW} - VB_{OLD})| > DENTOL \quad (5)$$

It is preferred that the density tolerance, DENTOL, be small, e.g., smaller than manufacturer's recommendation, and more preferably two times smaller. It is most preferred to be 0.05.

The next step 158 to be performed if density is not within tolerance (i.e., equation 5 is false), is to adjust the intensity of the light (hereinafter LDA) of the writing head 62 and the toner concentration printer parameters in combination to bring the density within specification. LDA, in comparison to toner concentration, is relatively a faster acting variable upon print density. Generally, 80% of the correction to density is made by changing LDA and 20% of the density correction is made by change in toner concentration.

LDA represents the intensity of a light source such as the light emitting diode array exposure. As shown in FIG. 7A, varying the LDA will result in a change of the exposure of the LED array. As the LED array exposure is increased or decreased, the density will increase or decrease. Thus increasing the LDA will increase the density of the toner because more toner will be deposited on the drum 58. A change in LDA has a greater impact on the darker coverage patches such as density and transfer than on the lighter coverage patches such as bias. Thus the effect of the change in LDA on BIAS is small. The relationship between a normalized change in LDA with a change in density is represented by equation 6 where CLDA is a proportionality constant that can be experimentally determined. For an IBM Infocolor 70, CLDA has a value of one.

$$\frac{\Delta LDA}{LDA} = \frac{LDA_{NEW} - LDA_{OLD}}{LDA_{OLD}} = \frac{\Delta DENSITY}{DENSITY} * CLDA \quad (6)$$

In order to calculate a new LDA setting as in step 158, equation 7 is substituted into equation 6, and represents the difference between the standard density and the measured density plus the change in density as a result of the bias voltage change.

$$\Delta DENSITY = (DENSTD - DENSITY) + (VB_{NEW} - VB_{OLD}) * CBVOD \quad (7)$$

Equation 6 can then be solved for $LDA_{NEW}$, which represents the new LDA setting that will correct density to the standard density value as is shown in equation 8. The variable PCTCORR represents the percent of the density correction due to changing LDA and can vary from 0 to 1. Thus 0.8 would represent an 80% correction due to LDA changes. In equation 8 and the following equations, $LDA_{old}$ always represents the initial LDA setting.

$$LDA_{NEW} = LDA_{OLD}\left[1 + PCTCORR * [(DENSTD - DENSITY) + \quad (8)$$

$$(VB_{NEW} - VB_{OLD}) * CBVOD] * \frac{CLDA}{DENSITY}\right]$$

To complete step 158, a new toner concentration setting must also be determined. As is shown in FIG. 7B, an increase in toner concentration results in an increase in density. The relationship between a normalized change in toner concentration with a change in density is represented by equation 9 where CTCO is a experimentally determined constant and is approximately equal to 1.0 for an IBM Infocolor 70 printer.

$$\frac{\Delta TC}{TC} = \frac{TC_{NEW} - TC_{OLD}}{TC_{OLD}} = \frac{\Delta DENSITY}{DENSITY} * CTCO \quad (9)$$

A new toner concentration setting can be determined by solving equation 9 for $TC_{NEW}$ after substituting Equation 7 into equation 9 resulting in equation 10. In equation 10 and the following equations, $TC_{old}$ represents the initial toner concentration setting.

$$TC_{new} = \quad (10)$$

$$TC_{old} + TC_{old} * (1 - PCTCORR) * [(DENSTD - DENSITY) +$$

$$(VB_{NEW} - VB_{OLD}) * CBVOD] * \frac{CTCO}{DENSITY}$$

If DENSITY is within its tolerance, i.e., equation 5 is true, then $LDA_{new} = LDA_{old}$, and $TC_{new} = TC_{old}$.

The next step 164 is to determine whether the transfer is within tolerance of the standard value. The effect of the change in LDA on transfer will be taken into account in step 164 and is reflected in equation 12. The effect of the change in bias voltage is already taken into account in the new LDA and TC values obtained for density correction. The relationship between a normalized change in LDA and a change in transfer is shown by equation 11, where CTR is an experimentally determined constant and is equal to approximately one for an IBM Infocolor 70 printer.

$$\frac{\Delta LDA}{LDA} = \frac{\Delta TRANSFER * CTR}{TRANSFER} \quad (11)$$

Thus step 164 is represented by equation 12 below, where TOLTRAN is the transfer tolerance which is generally larger in comparison to the other density tolerances.

$$\left|(TRANSTD - TRANSFER) - CLDA * \frac{(LDA_{new} - LDA_{old})}{LDA_{old}}\right| < \quad (12)$$

$$TOLTRAN$$

If equation 12 is false, the LDA setting is increased to correct the measured value TRANSFER to the standard value TRANSTD, step 168. As represented by equation 14, the new LDA setting is achieved by substituting equation 13 into equation 11 and solving for LDA. Equation 13 represents the difference in the standard transfer (TRANSTD) and the measured transfer (TRANSFER) plus the change in transfer as a result of the previous change in the LDA setting.

$$\Delta TRANSFER = (TRANSTD - TRANSFER) - \frac{\Delta LDA}{LDA} * CLDA \quad (13)$$

The equation for the LDA setting ($LDA_{NEWER}$) such to bring the transfer to its correct value is represented by equation 14, below.

$$LDA_{newer} = LDA_{old}\left[1 + \frac{CTR}{TRANSFER} * \quad (14)$$

$$\left((TRANSTD - TRANSFER) - CLDA * \frac{(LDA_{new} - LDA_{old})}{LDA_{new}}\right)\right]$$

The variable $LDA_{new}$ is then updated to the $LDA_{newer}$ value if TRANSFER has been corrected as represented by equation 15, below.

$$LDA_{new} = LDA_{newer} \quad (15)$$

The next step 170 is to check density to ensure that density is still within its tolerance taking into account the effect of the new change in LDA. The variable ERROR in equation 16, below represents the absolute value of the difference between the measured density and the standard density with the change in bias voltage, LDA and toner concentration taken into consideration. Thus if ERROR is less than DENTOL as represented in equation 17, then density is within tolerance.

$$ERROR = \left|(DENSTD - DENSITY) + CBVOD(VB_{NEW} - VB_{OLD}) + \quad (16)$$

$$\left(\frac{LDA_{NEW} - LDA_{OLD}}{LDA_{OLD}}\right)\left(\frac{DENSITY}{CLDA}\right) + \left[\frac{TC_{new} - TC_{old}}{TC_{old}}\right]\left[\frac{DENSITY}{CTCO}\right]\right|$$

$$ERROR < DENTOL \quad (17)$$

If equation 17 is not true, i.e., density is not within its tolerance, then LDA is changed again in Step 171. Equation 18 is utilized to obtain a new LDA setting which will bring density within its tolerance. Thus density will be corrected to a value within its tolerance as opposed to being corrected to the standard value.

$$LDA_{update} = LDA_{old}\left[1 + [\Delta DENS]\frac{CLDA}{DENSITY}\right] \quad (18)$$

The variable $LDA_{new}$ is then updated to the $LDA_{update}$ value as in equation 19, below.

$$LDA_{new} = LDA_{update} \quad (19)$$

The variable $\Delta DENS$ in equation 18 is determined by equation 20 if the variable ERROR from equation 16 is positive, and equation 21 if ERROR is negative, as shown below.

$$\Delta DENS = ERROR - DENTOL \quad (20)$$

$$\Delta DENS = ERROR + DENTOL \quad (21)$$

Additionally, all the above changes to the printer parameters LDA, TC, and VBIAS are inherently limited to small incremental changes of approximately 20% (of the full scale value), since all equations were linearized, i.e., the equations represent linear approximations of curved functions. These small changes are beneficial to the printer because it promotes printer stability. If larger changes are necessary, multiple passes of the above described process must be taken. This situation rarely occurs.

The following steps 172–184 involve checking whether the newly calculated LDA and toner concentration settings are within the printer's limits. Step 172 is to determine whether the new LDA setting is below the LDA lower limit ($LDA_{low}$). If the LDA setting is below the lower limit, then a new toner concentration setting is calculated to compensate for the LDA change such that the density is corrected, represented by equation 22, and then the LDA is reset to the lower limit as represented by equation 23. The variable $TC_{new}$ is then updated to the $TC_{newer}$ value as in equation 24, below.

$$TC_{newer} = TC_{new} + TC_{new} * \left[\frac{LDA_{new} - LDA_{low}}{LDA_{low}}\right] * \left[\frac{CTCO}{CLDA}\right] \quad (22)$$

$$LDA_{new} = LDA_{low} \quad (23)$$

$$TC_{new} = TC_{newer} \quad (24)$$

Step 176 is to determine whether the LDA setting exceeds its upper limit ($LDA_{high}$). If the upper limit is exceeded, a new toner concentration value is calculated which corrects density by compensating for the change in LDA (equation 25), and LDA is reset to the upper limit (equation 26). The valuable $TC_{new}$ is then updated to the $TC_{newer}$ value as in equation 27, below.

$$TC_{newer} = TC_{new} + TC_{new} * \left[\frac{LDA_{new} - LDA_{high}}{LDA_{high}}\right] * \left[\frac{CTCO}{CLDA}\right] \quad (25)$$

$$LDA_{new} = LDA_{high} \quad (26)$$

$$TC_{new} = TC_{newer} \quad (27)$$

Step 180 is to determine whether the toner concentration setting is below its lower limit ($TC_{low}$). If the toner setting is below the lower limit, a new LDA setting (equation 28) is calculated to compensate for the change in toner setting such that the density will still be corrected, the $LDA_{new}$ variable is updated to the $LDA_{newer}$ value (equation 29), and then the toner setting is reset equal to the lower limit (equation 30).

$$LDA_{newer} = LDA_{new} + LDA_{new} * \frac{(TC_{new} - TC_{low})}{TC_{low}} * \frac{[CLDA]}{CTCO} \quad (28)$$

$$LDA_{new} = LDA_{newer} \quad (29)$$

$$TC_{new} = TC_{low} \quad (30)$$

Step 184 is to determine whether the toner concentration setting exceeds its upper limit. If the upper limit is exceeded, a new LDA setting is calculated which compensates for the change in toner setting such that the density is still maintained within its tolerance (equation 31), the $LDA_{new}$ variable is updated to the $LDA_{newer}$ value (equation 32), and then the toner concentration setting is reset to the upper limit (equation 33).

$$LDA_{newer} = LDA_{new} + LDA_{new} * \frac{(TC_{new} - TC_{high})}{TC_{high}} * \frac{(CLDA)}{CTCO} \quad (30)$$

$$LDA_{new} = LDA_{newer} \quad (32)$$

$$TC_{new} = TC_{high} \quad (33)$$

If the correct values of density and transfer cannot be obtained because LDA and TC are at their limits, an error message will be sent to the monitor 83 to notify the operator of the inability to fully correct the densities to within their respective tolerances.

Figure 8:
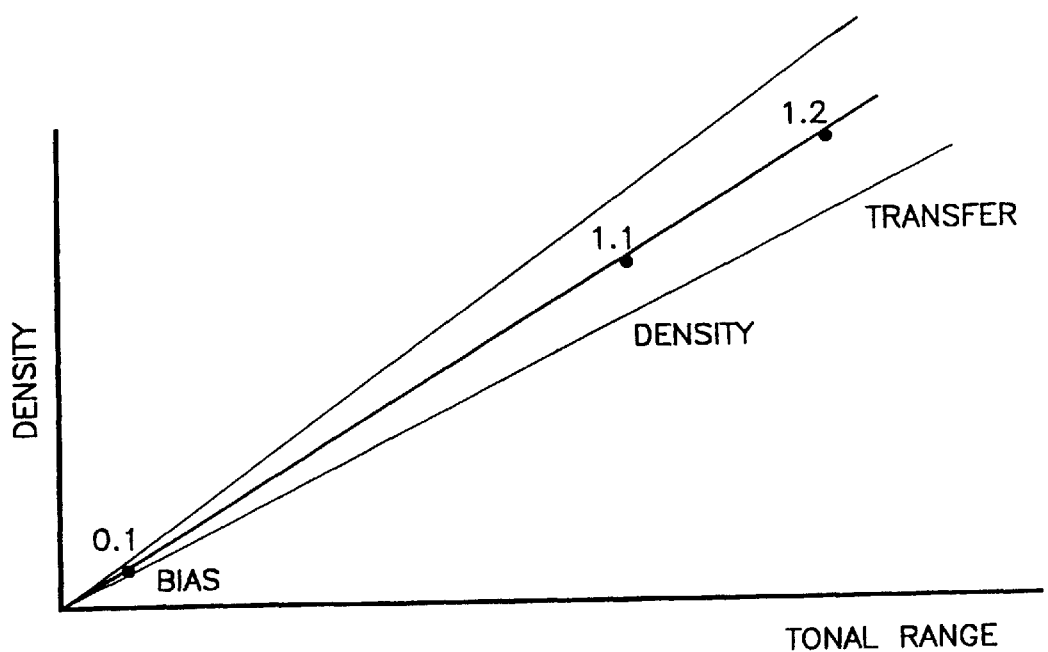
FIG. 8 is graphical representation of three density measurements taken within the tonal range and within an acceptable tolerance.

In summary, steps 120–184 have performed an analysis over the range of densities (see FIG. 8) to determine whether each nominal density is within its tolerance of the standard density and if not, calculate new printer parameter settings ($TC_{new}$, $VB_{new}$, and $LDA_{new}$) to bring the densities within an acceptable range. Then the parameter settings are checked to ensure they are within the printer's allowable limits. If any of the parameter settings are out of range, the deviant parameter setting is brought within range and another printer parameter is changed such that the pertinent density is still within range. The steps 130–184 are then repeated for each remaining print stations. Step 188 is an optional step which repeats the entire process i.e., steps 120–190 such that more accurate printer parameter settings can be determined. The last step 190 will be for the printer control processor to implement the 3 calculated printer parameter settings for each print station by sending the updated parameters to the Print Station Control Unit.

In a second embodiment the densitometer measures a number of control strips and the print control processor calculates and utilizes the average of the control strip values to correct density.

A third embodiment of the present invention is a semi-automatic version of the above described invention, where the densitometer is located external to the printer and is connected to the printer control processor by a serial connection or other means to transfer the densitometer output to the printer control processor. An operator manually sets up the densitometer such that it measures the control strip optical densities. Each densitometer reading is then communicated to the printer control processor. After the control strip measurements are performed, the printer control processor then calculates the new printer control settings to correct the optical densities for each print station. The operator is prompted by the printer whether to accept some or all of the changes. The operator has the option to select some or all of the changes to be implemented.

The operator also has the option to not measure all of the patches on the control strip. The algorithm will use what information is presented and make no assumptions regarding the unmeasured patches.

Although the invention has been described with respect to a color electrostatic printer, other printers such as color or monochrome laser printers and color or monochrome ink jet printers could be utilized as well. Although the invention has been disclosed and described with respect to certain preferred embodiments, certain variations and modifications may occur to those skilled in the art upon reading this specification. Any such variations and modifications are within the purview of the invention notwithstanding the defining limitations of the accompanying claims and equivalents thereof.

What is claimed is:

1. A method for controlling a density of a printed image on a medium of a printer comprising the steps of:

providing a printer comprising a memory device, an optical sensor, a control processor, and printer control parameters selected from the group consisting of: light exposure, toner concentration and bias voltage;

printing a control strip on the print medium having a bias patch and a density patch, wherein each of said patches has different standard optical density;

measuring an optical density of said bias patch and said density patch;

determining a bias tolerance limit for said bias patch and a density tolerance limit for said density patch;

calculating a new bias voltage and a corrected optical density of said density patch using the following equations if the optical density of said bias patch is not within said bias tolerance limit of said bias standard optical density:

$$VB_{NEW} = VB_{OLD} - (CBVOD*(BIASSTD - BIAS))$$

$$DENCOR = DENSTD - DENSITY + CBVOD*(VB_{NEW} - VB_{OLD})$$

wherein said $V_{NEW}$ is the new bias voltage, $VB_{OLD}$ is the measured bias voltage of said printer, CBVOD is an experimentally determined constant, BIASSTD is the bias standard optical density, BIAS is the optical density of the bias patch, DENCOR is the corrected optical density of said density patch, DENSTD is the standard optical density of said density patch, and DENSITY is the optical density of the density patch;

calculating a new light exposure setting ($LDA_{NEW}$) and a new toner concentration setting ($TC_{NEW}$) of said printer using the following equations if the corrected optical density of the density patch is not within said density tolerance limit of the standard optical density of the density patch:

$$LDA_{NEW} = LDA_{OLD} \left[ 1 + PCTCORR * [(DENSTD - DENSITY) + (VB_{NEW} - VB_{OLD}) * CBVOD] * \frac{CLDA}{DENSITY} \right]$$

$$TC_{NEW} = TC_{OLD} + TC_{OLD} * (1 - PCTCORR) * [(DENSTD - DENSITY) + (VB_{NEW} - VB_{OLD}) * CBVOD] * \frac{CTCO}{DENSITY}$$

wherein PCTCORR is a real number between 0 and 1, CBVOD, CLDA, CTCO are experimentally determined constants, $LDA_{OLD}$ is a measured light exposure, and $TC_{OLD}$ is a measured toner concentration; and adjusting the voltage bias setting of said printer to $VB_{NEW}$, adjusting the light exposure setting of the printer to $LDA_{NEW}$ and adjusting a toner concentration setting of the printer to said $TC_{NEW}$ value.

2. The method of claim 1 wherein said bias patch and said density patch have at least a 25% difference in standard optical density.

3. The method of claim 1 wherein said bias patch has a standard optical density in the range of about 5–10%.

4. The method of claim 1 wherein said density patch has a standard optical density in the range of about 90–100%.

5. The method of claim 4 wherein said bias tolerance limit of the bias patch is two times smaller than a manufacturer's bias tolerance, and said density tolerance limit of the density patch is three times smaller than the manufacturer's densty tolerance.

6. The method of claim 1 wherein said optical density of said bias patch and said density patch is an average of at least two measurements.

7. The method of claim 1 wherein said bias tolerance limit and density tolerance limit are equal to a manufacturer's bias tolerance and a manufacturer's density tolerance, respectively.

8. A method for correcting a density of a printed image of a medium of a printer comprising the steps of:

providing a printer comprising a memory device, an optical sensor, a control processor, and printer control parameters selected from the group consisting of: light exposure, toner concentration and bias voltage;

printing a control strip on the print medium having a bias patch, a density patch, and a transfer patch, wherein the bias patch, the density patch and the transfer patch each has a standard optical density;

measuring an optical density of the bias patch, the density patch and the transfer patch on the print medium;

determining a bias tolerance limit for said bias patch, a density tolerance for said density patch, and a transfer tolerance limit for said transfer patch;

calculating a new bias voltage and a corrected optical density of said density patch using the following equations if the optical density of said bias patch is not within said bias tolerance limit of said bias standard optical density:

$$VB_{NEW} = VB_{OLD} - (CBVOD*(BIASSTD - BIAS))$$

$$DENCOR = DENSTD - DENSITY + CBVOD*(VB_{NEW} - VB_{OLD})$$

wherein said $VB_{NEW}$ is the new bias voltage, $VB_{OLD}$ is the measured bias voltage of said printer, CBVOD is an experimentally determined constant, BIASSTD is the bias standard optical density, BIAS is the optical density of the bias patch, DENCOR is the corrected optical density of said density patch, DENSTD is the standard optical density of said density patch, and DENSITY is the optical density of the density patch;

calculating a new light exposure setting ($LDA_{NEW}$) and a new toner concentration setting ($TC_{NEW}$) of said printer using the following equations if the corrected optical density of the density patch is not within said density tolerance limit of the standard optical density of the density patch:

$$LDA_{NEW} = LDA_{OLD}\left[1 + PCTCORR * [(DENSTD - DENSITY) + (VB_{NEW} - VB_{OLD}) * CBVOD] * \frac{CLDA}{DENSITY}\right]$$

$$TC_{NEW} = TC_{OLD} + TC_{OLD} * (1 - PCTCORR) * [(DENSTD - DENSITY) + (VB_{NEW} - VB_{OLD}) * CBVOD] * \frac{CTCO}{DENSITY}$$

wherein PCTCORR is a real number between 0 and 1, CBVOD, CLDA, CTCO are experimentally determined constants, $LDA_{OLD}$ is a measured light exposure and $TC_{OLD}$ is a measured toner concentration; and calculating a new light exposure setting, a new toner concentration setting and a corrected transfer optical density (TRANSCOR) using the following equations if the corrected optical density of the density patch is not within said density tolerance limit of the standard optical density of the density patch:

$$LDA_{NEW} = LDA_{OLD}\left[1 + PCTCORR * [(DENSTD - DENSITY) + (VB_{NEW} - VB_{OLD}) * CBVOD] * \frac{CLDA}{DENSITY}\right]$$

$$TC_{NEW} = TC_{OLD} + TC_{OLD} * (1 - PCTCORR) * [(DENSTD - DENSITY) + (VB_{NEW} - VB_{OLD}) * CBVOD] * \frac{CTCO}{DENSITY}$$

$$\left|(TRANSTD - TRANSFER) - CLDA * \frac{(LDA_{NEW} - LDA_{OLD})}{LDA_{OLD}}\right| = TRANSCOR$$

wherein TRANSTD is a standard transfer optical density, and TRANSFER is a measured transfer optical density;

calculating a new light exposure setting ($LDA_{NEWER}$) if the corrected transfer optical density is not within the transfer tolerance limit of the standard optical density of the transfer patch using the following equations:

$$DA_{NEWER} = LDA_{OLD}\left[1 + \frac{CTR}{TRANSFER} * \left((TRANSTD - TRANSFER) - CLDA * \frac{(LDA_{NEW} - LDA_{OLD})}{LDA_{NEW}}\right)\right] LDA_{NEW} = LDA_{NEWER};$$

and adjusting a bias voltage setting of said printer to the $VB_{NEW}$, adjusting a light exposure setting of the printer to the $LDA_{NEW}$, and adjusting a toner concentration setting of the printer to said $TC_{NEW}$ value.

9. The method of claim 8 wherein said bias patch and said density patch have at least a 25% difference in standard optical density.

10. The method of claim 8 wherein said bias patch has a standard optical density in the range of about 5–10%, and the density patch has a standard optical density in the range of about 85–90% and said transfer patch has a standard optical density in the range of about 95–100%.

11. The method of claim 10 wherein a bias tolerance limit for the bias patch is two times smaller than a manufacturer's bias tolerance, and a density tolerance limit for the density patch is three times smaller than the manufacturer's density tolerance and the transfer tolerance of the transfer patch is equal to the manufacturer's transfer tolerance.

12. The method of claim 8 wherein said bias, density and transfer patches have a standard optical density of about 5%, 90% and 95%, respectively.

13. The method of claim 8 wherein said optical density of said bias, transfer and density patches are an average of at least two measurements.

14. The method of claim 8 wherein said bias tolerance limit is equal to a manufacturer's bias tolerance, a density tolerance limit is equal to a manufacturer's density tolerance, and the transfer tolerance limit is equal to a manufacturer's transfer tolerance.

15. An apparatus for controlling a density of a printer comprising:

a printer mechanism adapted for printing upon a medium having at least one print station with said print station having printer control parameters comprising toner concentration, bias voltage, and light exposure;

said printer mechanism adapted for printing a control strip on the print medium having bias patch and a density patch, wherein each of said patches has a standard optical density which is different from each other;

a calibrated optical sensor assembly adapted for measuring an optical density of said bias and density patches;

a memory device for storing a bias tolerance limit and a density tolerance limit for said bias and density patches, respectively;

a control processor adapted for calculating a new bias voltage and a corrected optical density of said density patch using the following equations if the optical density of said bias is not within said bias tolerance limit of said standard optical density of said bias patch:

$$VB_{NEW} = VB_{OLD} - (CBVOD * (BIASSTD - BIAS))$$

$$DENCOR = DENSTD - DENSITY + CBVOD * (VB_{NEW} - VB_{OLD})$$

wherein said $VB_{NEW}$ is the new bias voltage, $VB_{OLD}$ is the measured bias voltage of said printer, CBVOD is an experimentally determined constant, BIASSTD is the standard optical density of the bias patch, BIAS is the optical density of the bias patch, DENCOR is the corrected optical density of said density patch, DENSTD is the standard optical density of said density patch, and DENSITY is the optical density of the density patch;

said control processor further adapted to calculating a new light exposure setting ($LDA_{NEW}$) and a new toner concentration setting ($TC_{NEW}$) of said printer using the following equations if the corrected optical density of the density patch is not within said density tolerance limit of the density standard optical density:

$$LDA_{new} = LDA_{OLD}\left[1 + PCTCORR * [(DENSTD - DENSITY) + (VB_{new} - VB_{old}) * CBVOD] * \frac{CLDA}{DENSITY}\right]$$

$$TC_{NEW} = TC_{OLD} + TC_{OLD} * (1 - PCTCORR) * [(DENSTD - DENSITY) + (VB_{NEW} - VB_{OLD}) * CBVOD] * \frac{CTCO}{DENSITY}$$

wherein PCTCORR is a real number between 0 and 1, CBVOD, CLDA, CTCO are experimentally determined constants, $LDA_{OLD}$ is a measured light exposure, and $TC_{OLD}$ is a measured toner concentration; and said control processor further adapted to adjusting the bias voltage setting of said printer to $VB_{NEW}$, adjusting the light exposure setting of the printer to $LDA_{NEW}$ and adjusting a toner concentration setting of the printer to said $TC_{NEW}$ value.

16. The apparatus as in claim 15 wherein said optical sensor assembly is a densitometer.

17. The apparatus as in claim 15 wherein said printer is a color printer comprising at least three print stations.

18. The apparatus as in claim 15 wherein said bias patch and said density patch have at least a 25% difference in standard optical density.

19. The apparatus as in claim 15 wherein said bias and density patches have a standard optical density in the range of about 5–10% and about 90–100% respectively.

20. The apparatus as in claim 19 wherein said bias tolerance limit of the bias patch is two times smaller than a manufacturer's bias tolerance, and said density tolerance limit of the density patch is three times smaller than the manufacturer's density tolerance.

21. The apparatus as in claim 15 wherein said optical density of said bias patch and the density patch is an average of at least two measurements.

22. The apparatus as in claim 15 wherein said bias tolerance limit is equal to a manufacturer's bias tolerance.

23. An apparatus for controlling a density of a printer comprising:
- a printer mechanism adapted for printing upon a medium having at least one print station with said print station having printer control parameters comprising toner concentration, bias voltage and light exposure;
- said printer mechanism, adapted for printing a control strip on the print medium having a bias patch, a density patch, and a transfer patch, wherein each of said patches has a standard optical density which is different from each other;
- a calibrated optical sensor assembly adapted for measuring an optical density of said bias patch, said density patch and said transfer patch;
- a memory device for storing a bias tolerance limit, a density transfer limit and a transfer tolerance limit for said bias patch, said density patch and said transfer patch, respectively;
- a control processor adapted for calculating a new bias voltage and a corrected optical density of said density patch using the following equations if the bias optical density is not within said bias tolerance limit of said bias standard optical density:

$VB_{NEW} = VB_{OLD} - (CBVOD * (BIASSTD - BIAS))$ $DENCOR = DENSTD - DENSITY + CBVOD * (VB_{NEW} - VB_{OLD})$ wherein said $VB_{new}$ is the new bias voltage, $V_{bold}$ is the measured bias voltage of said printer, CBVOQ is an experimentally determined constant, BIASSTQ is the standard optical density of the bias patch, BIAS is the optical density of the bias patch, DENCOR is the corrected optical density of said density patch, DENSTD is the standard optical density of said density patch, and DENSITY is the optical density of the density patch, said control processor further adapted for calculating a new light exposure setting ($LDA_{NEW}$), a new toner concentration setting ($TC_{NEW}$), and a corrected transfer optical density (TRANSCOR) using the following equations if the corrected optical density of the density patch is not within said density tolerance limit of the standard optical density for the density patch:

$$LDA_{new} = LDA_{OLD}\left[1 + PCTCORR * [(DENSTD - DENSITY) + (VB_{new} - VB_{old}) * CBVOD] * \frac{CLDA}{DENSITY}\right]$$

$$TC_{NEW} = TC_{OLD} + TC_{OLD} * (1 - PCTCORR) * [(DENSTD - DENSITY) + (VB_{NEW} - VB_{OLD}) * CBVOD] * \frac{CTCO}{DENSITY}$$

$$\left|(TRANSTD - TRANSFER) - CLDA * \frac{(LDA_{NEW} - LDA_{OLD})}{LDA_{OLD}}\right| = TRANSCOR$$

wherein PCTCORR is a real number between 0 and 1, CBVOD, CLDA, CTCO are experimentally determined constants, LDAOLD is a measured light exposure, TCOLD is a measured toner concentration, TRANSTD is a standard transfer optical density, and TRANSFER is a measured transfer optical density;

said control processor adapted for calculating a new light exposure setting ($LDA_{NEWER}$) if the corrected transfer optical density is not within the transfer tolerance limit of the standard optical density of the transfer patch using the following equations:

$$LDA_{newer} = LDA_{OLD}\left[1 + \frac{CTR}{TRANSFER} * \left((TRANSTD - TRANSFER) - CLDA * \frac{(LDA_{NEW} - LDA_{OLD})}{LDA_{OLD}}\right)\right] LDA_{NEW} = LDA_{newer};$$

said control processor further adapted to adjusting the bias voltage setting of said printer to $VB_{NEW}$, adjusting the light exposure setting of the printer to $LDA_{NEW}$ and adjusting a toner concentration setting of the printer to said $TC_{NEW}$ value.

24. The apparatus as in claim 23 wherein said optical sensor assembly is a densitometer.

25. The apparatus as in claim 23 wherein said printer is a color electrostatic printer comprising at least three print stations.

26. The apparatus as in claim 23 wherein two of said three coverage patches have at least a 25% difference in optical density.

27. The apparatus as in claim 23 wherein said bias patch has a standard optical density in the range of about 5–10%, and the density patch has a standard optical density in the range of about 85–90% and the transfer patch has a standard optical density in the range of about 95–100%.

28. The apparatus as in claim 27 wherein a bias tolerance limit for the bias patch is two times smaller than a manufacturer's bias tolerance, and a density tolerance limit for the density patch is three times smaller than the manufacturer's density tolerance and the transfer tolerance of the transfer patch is the manufacturer's transfer tolerance.

29. The apparatus as in claim 23 wherein said bias, density and transfer patches have a standard optical density of about 5%, 90% and 95%, respectively.

30. The apparatus as in claim 29 wherein said bias tolerance limit of the bias patch is two times smaller than a manufacturer's bias tolerance, and said density tolerance limit of the density patch is three times smaller than the manufacturer's density tolerance and said transfer tolerance of the transfer patch is the manufacturer's transfer tolerance.

31. The apparatus as in claim 23 wherein said measurements of said optical densities of said bias, density and transfer patches are an average of at least two measurements.

32. The apparatus as in claim 23 wherein said bias tolerance limit is equal to a manufacturer's bias tolerance.

* * * * *

UNITED STATES PATENT AND TRADEMARK OFFICE
CERTIFICATE OF CORRECTION

PATENT NO. : 6,147,698

DATED : November 14, 2000

INVENTOR(S) : Jack Louis Zable and William Chesley Decker

It is certified that error appears in the above-identified patent and that said Letters Patent is hereby corrected as shown below:

In the Claims:

Claim 1, line 46, after "said" change "$V_{new}$" to --$VB_{new}$--;

Claim 5, line 27, after "manufacturer's" change "densty" to --density--;

Claim 8, line 55, change "$DA_{newer}$" to --$LDA_{newer}$--;

Claim 26, lines 65 and 66, after "wherein" change "two of said three coverage" to --said bias and density--;

line 66, after "in" insert --standard--.

Signed and Sealed this

Twenty-ninth Day of May, 2001

*Attest:*

NICHOLAS P. GODICI

*Attesting Officer*     *Acting Director of the United States Patent and Trademark Office*